Patented July 13, 1937

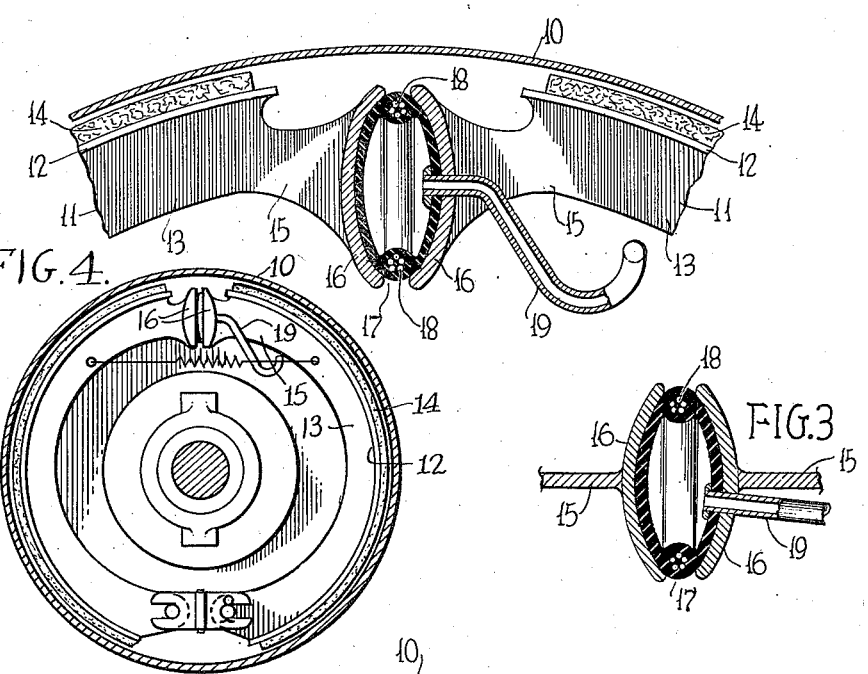
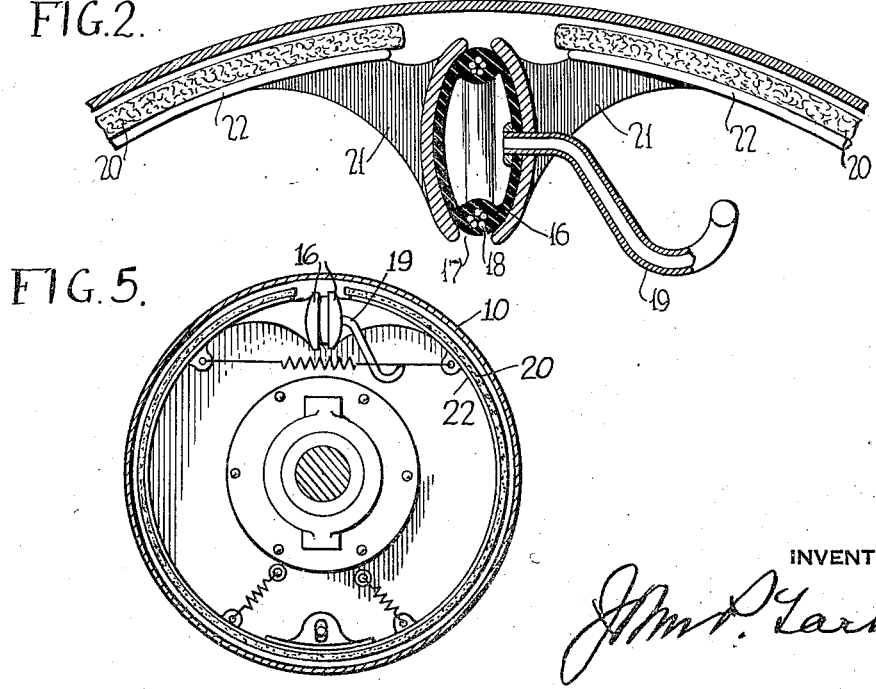

2,087,196

UNITED STATES PATENT OFFICE 2,087,196

BRAKE

John P. Tarbox, Philadelphia, Pa., assignor to Budd Wheel Company, Philadelphia, Pa., a corporation of Pennsylvania Application June 30, 1932, Serial No. 620,162

3 Claims. (Cl. 188—152)

The invention relates to vehicles, and particularly to vehicle brakes and methods of actuating them.

The prime object of my invention is the simplification of brake actuating means, and the elimination of some of the component parts now included in present brakes.

Broadly, I have attained the objects of my invention by modifying the form of the adjacent ends of brake elements, and by interposing an expansible member in between such ends whereby to actuate the elements, by forcing them into contact with the brake drum.

Other objects and advantages, particularly relating to improvements in detail, will be apparent after a reading of the sub-joined specifications in light of the attached drawing, in which Figure 1 is an elevational view showing the part of the structure in cross section.

Figure 2 is a view similar to Figure 1 showing a modified form of the invention.

Figure 3 is a vertical cross section through the brake actuators shown in Figures 1 and 2.

Fig. 4 is a sectional elevational view of the entire brake in accordance with the form of the invention shown in Fig. 1.

Fig. 5 is a similar view of the entire brake in accordance with the form of the invention shown in Fig. 2.

Referring now to the drawing by reference characters, the embodiments shown are applied to what are commonly known as internal expanding brakes, in which a series of brake shoes or other elements are disposed within a cylindrical drum, and are adapted to be expanded into contact with the drum to arrest the movement of the vehicle. Such a cylindrical drum is indicated generally by numeral 10. In the form of Figure 1, brake shoes of T-section, indicated by numeral 11, consist of axially extending portions 12 and centrally disposed radially extending web members 13. The usual brake lining 14 or other friction material is provided on the exterior surface of the axially extending portion 12.

In accordance with my invention I provide an extension 15 on the adjacent ends of the respective shoes 11 and further provide a cup shaped member 16 at the end of such extension, extending laterally from such extension. Between the respective cup shaped ends 16 of the abutting shoes 11, I provide an expansible nonmetallic element 17, preferably formed of flexible rubber. This element 17 is generally oval in radial cross section, and annular in axial section as indicated by the various cross sections shown in Figures 1 and 3. This rubber element 17 is provided with a series of annular windings 18 of tension resisting material, whereby expansion of the rubber element 17 under pressure will be confined to a direction parallel to the minor axis of the oval. The cup-shaped end portions 16 of the brake shoes are juxtaposed to each other and to the oval contour of the said actuating element 17.

I have preferred to actuate the rubber element 17 by admitting fluid pressure to the interior of such element through a flexible coupling 19 leading through one of the cup shaped end members 16 adjacent the extension 15 of shoe 11, and thence into the interior of the rubber element 17. This flexible coupling 19 is connected to any device usual in this art for admitting fluid under pressure thereto at the will of the operator. It will be seen that the admission of fluid under pressure will cause the rubber element 17 to expand along its minor axis, or circumferentially of the brake drum 10. This expansion will be confined directly parallel to the minor axis by virtue of the annular windings 18, restraining improper expansion which might otherwise occur in the direction of least resistance parallel to the major axis of the oval. The complementally shaped end portions 16 of the respective shoes 11 very nearly enclose the rubber element 17 when the brake shoes are in an inoperative position, thus protecting it from dirt and moisture.

It will be understood that the shoes 11 will be pivotally mounted through pivots fixed to the backing plate at points 11a, 11a as illustrated more or less diagrammatically in Figure 4 substantially diametrically opposite the point of application, which anchorage will be entirely sufficient to withstand the most severe torque reaction set up by braking the vehicle from high speeds. The showing in Figure 4 is purely illustrative of one well-known form of mounting of the shoes, it being understood that the particular form of mounting shown forms no part of the invention as claimed herein.

In the modification of Figures 2 and 5, I have shown my invention as applied to a wrapping band brake, in which I have shown a pair of moulded linings 20, the adjacent ends of which are provided with terminal members 21 of very much the same configuration as the cup shaped members 16 and extensions 15 shown and described in connection with Figure 1, the band being anchored against rotation with the drum by any known means such as the anchor pin and slot connection 22a shown in Figure 5. This mounting of the band is purely illustrative and forms no part of the invention claimed herein. These terminal members may be of fibre, metal, or any insulating material, and are preferably vulcanized or riveted to linings 20 through their abutting portions, indicated generally by numeral 22. The rubber element 17 in this modified form is the same as that used in Figure 1, thus necessitating no further description.

The cup-shaped members 16 of Figure 1 and 21 of Figure 2 may be formed of insulating material, or may be properly insulated from the metal of the brake shoe or the body of the brake lining in order to prevent the transmission of heat to the rubber element 17. Such insulation will undoubtedly lengthen the service life of the actuator 17 and insure its increased efficiency.

The advantages of such a simplified construction are apparent. No complicated hydraulic cylinder is necessary, the brake shoes being actuated by the simple rubber element interposed between adjacent ends of the brake elements. The flexible coupling allows unrestrained movement of the shoes and supplies fluid to the rubber element 17 in any position. It will be seen that a number of parts have been eliminated, and my invention is thus characterized by its simplicity and high degree of utility.

I am aware that many modifications of my invention may be made without departing from the spirit thereof, and I do not wish to be limited to the circumstantial terminology of the specifications but rather solely by the scope of the appended claims.

What I claim is:

1. A fluid pressure servo motor brake actuating mechanism comprising a pair of juxtaposed brake shoe actuating elements having transversely extending faces of determinate area juxtaposed to each other but adjacent and spaced apart a relatively small distance, a generally disc-like bag of elastic material located in said space with its opposite faces free to expand and in contact with the said juxtaposed faces of the actuating elements and having a free annular periphery lying within the respective peripheries of the faces of said actuating elements restrained against peripheral expansion wholly by reinforcing means within the body thereof, and a fluid pressure connection to said bag.

2. A servo motor mechanism according to claim 1 in which the two juxtaposed actuating members present concave faces toward each other and the reinforced periphery of the bag lies within the peripheral margins of the concavities.

3. A brake actuating mechanism according to claim 1 in which at least one of said brake shoe actuating members is provided with a curvilinear juxtaposed face to which the side wall of the bag conforms and upon which also the reinforced periphery bears.

JOHN P. TARBOX.